19-145

Draftsman

BEST AVAILABLE COPY

O. B. Tomlinson.

Fabrics for Hats.

A. I. № 132 Feb. 5, 1856

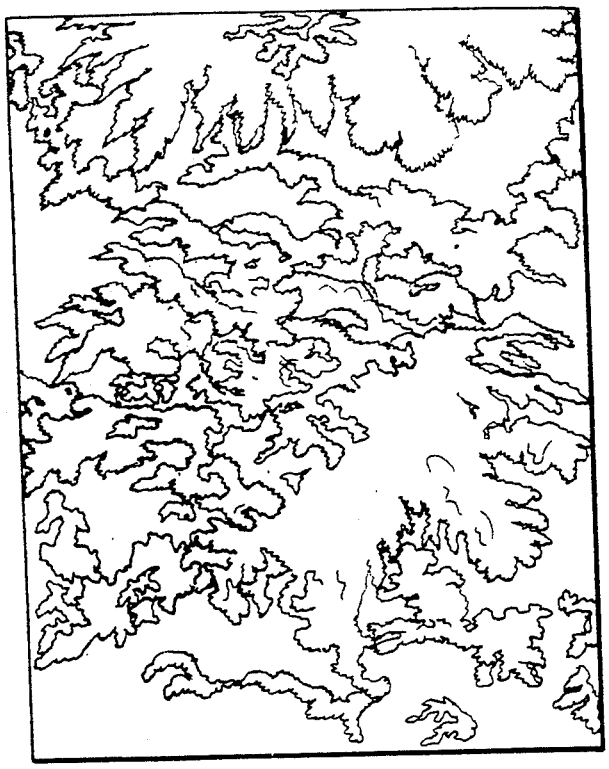

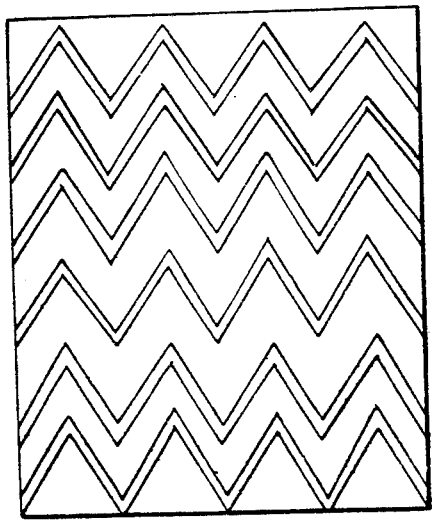

No. 132, to original Letters Patent, No. 13,018.—*Improvement in the Manufacture of Ornamental Felt-Cloth.*

What I claim is, the manufacturing of ornamental felt fabrics by placing loose, woven, or knit felting or shrinking fabrics, of any color or design, upon the surface of a sheet of batting composed of any felting or shrinking substance; and shrinking the same ornamenting fabric or fabrics into the body of the felt in the manner substantially as described, to form an ornamental felt fabric of the character and quality described, for the purpose set forth.

O. B. Tomlinson.